United States Patent
Raman et al.

(10) Patent No.: US 8,145,686 B2
(45) Date of Patent: Mar. 27, 2012

(54) MAINTENANCE OF LINK LEVEL CONSISTENCY BETWEEN DATABASE AND FILE SYSTEM

(75) Inventors: Balan Sethu Raman, Redmond, WA (US); Kangrong Yan, Bellevue, WA (US); Rajeev B. Rajan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 11/123,563

(22) Filed: May 6, 2005

(65) Prior Publication Data

US 2006/0253502 A1  Nov. 9, 2006

(51) Int. Cl.
*G06F 12/00* (2006.01)
*G06F 17/30* (2006.01)

(52) U.S. Cl. ........ 707/821; 707/703; 707/826; 711/161; 711/162

(58) Field of Classification Search .......... 707/200–206, 707/703–704, 821–826
See application file for complete search history.

(56) References Cited

U.S. PATENT DOCUMENTS

| | | | |
|---|---|---|---|
| 5,297,279 A | | 3/1994 | Bannon et al. ............... 707/103 |
| 5,335,343 A | * | 8/1994 | Lampson et al. ............... 714/19 |
| 5,437,027 A | | 7/1995 | Bannon et al. ............... 395/600 |
| 5,574,902 A | * | 11/1996 | Josten et al. ..................... 707/1 |
| 5,721,918 A | * | 2/1998 | Nilsson et al. ................ 707/202 |
| 5,864,862 A | | 1/1999 | Kriens et al. .................. 707/103 |
| 5,900,870 A | | 5/1999 | Malone et al. ................ 715/866 |
| 5,966,706 A | * | 10/1999 | Biliris et al. ..................... 707/10 |
| 6,047,291 A | | 4/2000 | Anderson et al. ............. 707/103 |
| 6,070,174 A | | 5/2000 | Starek et al. .................. 707/206 |
| 6,108,004 A | | 8/2000 | Medl .............................. 715/804 |
| 6,112,024 A | | 8/2000 | Almond et al. ............... 717/122 |
| 6,173,292 B1 | * | 1/2001 | Barber et al. ................. 707/200 |
| 6,199,100 B1 | | 3/2001 | Filepp et al. .................. 709/203 |
| 6,199,195 B1 | | 3/2001 | Goodwin et al. ............. 717/104 |
| 6,223,344 B1 | | 4/2001 | Gerard et al. ................. 717/170 |
| 6,338,056 B1 | | 1/2002 | Dessloch et al. .................. 707/2 |
| 6,370,541 B1 | | 4/2002 | Chou et al. .................... 707/103 |
| 6,453,325 B1 | * | 9/2002 | Cabrera et al. ................ 707/204 |
| 6,505,211 B1 | | 1/2003 | Dessloch et al. .......... 707/103 Y |
| 6,519,597 B1 | | 2/2003 | Cheng et al. .................... 707/10 |
| 6,549,916 B1 | | 4/2003 | Sedlar ............................ 707/200 |
| 6,556,983 B1 | | 4/2003 | Altschuler et al. .............. 706/55 |
| 6,564,205 B2 | | 5/2003 | Iwata et al. ........................ 707/2 |
| 6,571,259 B1 | * | 5/2003 | Zheng et al. .................. 707/205 |

(Continued)

OTHER PUBLICATIONS

C. Mohan, ARIES: A Transaction Recovery Method Supporting Fine-Granularity Locking and Partial Rollbacks Using Write-Ahead Logging, Mar. 1992, ACM Transactions on Database Systems, vol. 17, pp. 94-162.*

(Continued)

*Primary Examiner* — Mohammad Ali
*Assistant Examiner* — Angelica Ruiz
(74) *Attorney, Agent, or Firm* — Woodcock Washburn LLP (57) ABSTRACT

Methods and computer-readable media for maintaining transactional link-level consistency between a database and a file system. A file system change is logged in a record of a database log and a file corresponding to the file system change is created in a file system folder. During a restart recovery process, an analysis operation and a conditional redo operation are performed based on the database log, and a conditional redo operation and an undo operation are performed based on the files in the file system folder. An undo operation is then performed based on the database log.

11 Claims, 5 Drawing Sheets

U.S. PATENT DOCUMENTS

| | | | |
|---|---|---|---|
| 6,578,046 | B2 | 6/2003 | Chang et al. ................... 707/4 |
| 6,631,385 | B2* | 10/2003 | Kim et al. ................... 707/202 |
| 6,671,687 | B1 | 12/2003 | Pederson et al. ................. 707/9 |
| 6,708,196 | B1 | 3/2004 | Atkinson et al. ............. 718/102 |
| 6,732,124 | B1* | 5/2004 | Koseki et al. ............... 707/202 |
| 6,772,178 | B2 | 8/2004 | Mandal et al. ............... 707/204 |
| 6,785,690 | B1 | 8/2004 | Davidson ................ 707/103 Y |
| 6,944,635 | B2* | 9/2005 | Kim et al. ................... 707/202 |
| 7,143,120 | B2* | 11/2006 | Oks et al. ................... 707/202 |
| 7,206,805 | B1* | 4/2007 | McLaughlin, Jr. ............ 709/203 |
| 7,277,905 | B2* | 10/2007 | Randal et al. ................ 707/204 |
| 7,290,056 | B1* | 10/2007 | McLaughlin, Jr. ............ 709/230 |
| 2002/0091702 | A1 | 7/2002 | Mullins ....................... 707/100 |
| 2002/0103819 | A1* | 8/2002 | Duvillier et al. ............. 707/206 |
| 2002/0143798 | A1* | 10/2002 | Lisiecki et al. ............. 707/200 |
| 2002/0147774 | A1* | 10/2002 | Lisiecki et al. ............. 709/203 |
| 2002/0152422 | A1 | 10/2002 | Sharma et al. ................. 714/13 |
| 2002/0198891 | A1 | 12/2002 | Li et al. ....................... 707/102 |
| 2003/0041097 | A1* | 2/2003 | Tormasov .................... 709/201 |
| 2004/0148308 | A1 | 7/2004 | Rajan et al. |
| 2005/0223043 | A1* | 10/2005 | Randal et al. ................ 707/200 |
| 2005/0278394 | A1* | 12/2005 | Oks et al. ................... 707/202 |
| 2005/0289169 | A1* | 12/2005 | Adya et al. ................... 707/101 |
| 2005/0289414 | A1* | 12/2005 | Adya et al. ................... 714/724 |
| 2006/0004860 | A1* | 1/2006 | Liedes et al. .............. 707/104.1 |

OTHER PUBLICATIONS

Andrews, T. et al., "Combining Language and Database Advances in an Object-Oriented Development Environment", *OOPSLA Proceedings*, Oct. 4-8, 1987, 430-440.

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistence in Database Programming Languages", *ACM*, 1986, 4-15.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Varlamis, I. et al., "Bridging XML-Schema and Relational Databases. A System for Generating and Manipulating Relational Databases Using Valid XML Documents", *DocEng 'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

Findler, R.B. et al., "Contract Soundness for Object-Oriented Languages" *ACM Conference on Object-Oriented Programming Systems, Languages, and Applications, OOPSLA*, 2001, 15 pages.

Harrison, C.J. et al., Structure Editors: User-Defined Type Values and Type Inference, *IEEE*, 2000, 241-247.

Michael Stonebraker, "Inclusion of New Types in Relational Data Base Systems", *IEEE International Conference on Data Engineering*, 1986, 1-19.

Berg, C., "How Do I Create Persistent Java Objects?", *Dr. Dobb's Journal*, 1997, 22(4), 98-101.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serialization in Java 1.1. Making Objects Persistent", *Web Techniques*, 1997, 2(9), 55, 58-59.

Frost., "Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, Abstract Only, 2 pages.

Haverlock, K., "Object Serialization, Java, and C++", *Dr. Dobbs. Journal*, 1998, 23(8), 32, 34, 36-37.

King, et al., "TriStarp—An Investigation into the Implementation and Exploitation of Binary Relational Storage Structures", *Proc. 8 Supppl BNCOD(British National Conference on Data Bases)*, 1990, 64-84.

Adam, Nabil R., et al., "SI in Digital Libraries, Scaling on an international level requires integrating independently evolved sytems," Communications of the ACM, vol. 43, No. 6, Jun. 2000, pp. 64-72.

Hull, Richard, "Managing Semantic Heterogeneity in Databases: A Theoretical Perspective," PODS '97, Tucson Arizona, 1997, pp. 51-61.

Klavans, Judith, "Data Bases in Digital Libraries: Where Computer Science and Information Management Meet," PODS 98, Seattle, Washington, 1998, pp. 224-226.

Schauble, Peter, "SPIDER: A Multiuser Information Retrieval System for Semistructured and Dynamic Data," ACM-SIGIR '93, Pittsburgh, Pennsylvania, Jun. 1993, pp. 318-327.

Shapiro, Michael, et al., "Managing Databases with Binary Large Objects," IEEE, 1999, pp. 185-193.

Suciu, Dan, "Distributed Query Evaluation on Semistructured Data," ACM Transactions on Database Systems, vol. 27, No. 1, Mar. 2002, pp. 1-62.

Wang, Ke, et al., Discovering Typical Structures of Documents: A Road Map Approach, SIGIR '98, Melbourne, Australia, 1998, pp. 146-154.

Zdonik, Stanley B., "Incremental Database Systems: Databases from the Ground Up," SIGMOD 5/93, Washington, DC, 1993, pp. 408-412.

EP Application No. 06737449.6 : Extended European Search Report, Aug. 5, 2010, 6 pages.

* cited by examiner

MAINTENANCE OF LINK LEVEL CONSISTENCY BETWEEN DATABASE AND FILE SYSTEM

FIELD OF THE INVENTION

This invention relates in general to the field of database management. More particularly, the invention relates to maintaining link-level consistency between a database and a corresponding file system.

BACKGROUND OF THE INVENTION

Recently there has been a tremendous increase in the use of large unstructured data types such as pictures, videos and movies, with an accompanying need to store these large streams of data in an efficient manner. Traditionally, data has been stored in a construct such as a file system or in a database.

A file system is a hierarchical structure of data in which files are stored within folders on a storage medium such as a hard disk. A part of the operating system maintains the file system and controls access to the files in the file system. File systems are good at streaming large quantities of unstructured data in and out of files. One of the problems with the file system as it is presently known is that files must be manually organized into groups (folders and sub-folders) and if the user forgets where he has stored a particular file, it may be difficult to find the file again. This problem is exacerbated by technology drivers such as advances in disk technology which have seen the development of larger and larger hard disks. The sheer volume of data capable of storage on a single disk can make keeping track of files in a file system an extremely difficult task.

The other widely used method of data organization is a database. A database system stores data as one or more tables in which each row of the table comprises groups of related data elements concerning an entity and columns that represent useful pieces of information about the entity that is the subject of the row. For example, a database of human resources information may be maintained in which each row of the human resources database represents an employee and each column in the human resources database represents data elements such as employee name, employee social security number and employee pay rate.

Databases provide a number of useful advantages over the file system organization of data. Database management systems are good at storing, finding and retrieving small pieces of structured data. Typically, in addition, there are highly flexible means of searching for and accessing specified portions of the data stored in the database. However, databases have not handled the storage and access of large pieces of unstructured data, referred to as BLOBs (binary large objects), particularly well.

Specifically, when a database includes a BLOB column, typically the BLOB is torn apart into small pieces that are scattered across the disk. The entry in the database column contains a pointer to the first of the pieces of the BLOB rather than containing the BLOB itself. This situation leads to inefficiencies in retrieving the data in the BLOB because the different pieces of the BLOB must be found and reassembled. Typically, to reduce the impact of these inefficiencies, a pointer to the first piece of the BLOB would be returned instead of instantly retrieving the BLOB itself.

For example, suppose a database of employee information includes a BLOB column for an employee photograph. Suppose a user requests a particular employee photograph, and is returned a pointer to the photograph. The pointer represents a physical location—e.g., a 16-byte hexadecimal value representing the actual disk address of the sector of the disk where the first piece of the photograph is stored. Several problems can arise in this situation. In addition to the disk address being unintelligible to the user, if the operating system reorganizes the data on the disk, the photograph may no longer exist at that location, in which case a "not found" message will be returned to the user.

Recently, another way to store BLOBs has been developed where a BLOB is stored as a contiguous file or "FILESTREAM" in the file system. A FILESTREAM data storage attribute is provided that can be used to tag a column in a relational table. The FILESTREAM attribute indicates that the data for that column will be stored as a file in the file system of the operating system (OS). The database management system manages the creation and deletion of the file in the file system. There is a 1:1 reference between the file in the file system and a cell (intersection of row and column). The data in the FILESTREAM column can be manipulated the same way as the data in other columns using a programming language, such as SQL or MICROSOFT®'s T-SQL.

Thus, a FILESTREAM column is used in a database for large unstructured data. The use of a FILESTREAM data storage attribute enables large unstructured data to be stored as a contiguous file in the file system while remaining accessible to a database. Such a database management system needs to maintain consistency of the links (i.e., "link-level consistency") between a database row having a FILESTREAM attribute and its corresponding FILESTREAM data to ensure data integrity and to avoid corruption of the database. For example, if a fault such as a power failure or system crash occurs prior to the time at which a change is committed to disk (or "flushed"), several problems may result. For example, the database may not reflect the existence of a file or directory that exists in the file system; or, alternatively, the database may reflect the existence of a file or directory that does not exist in the file system. Thus, a broken link between the database and the file compromises the integrity of the database because a database user cannot be assured that the database accurately reflects the current state of the data represented by the FILESTREAM cell in the database column.

Typically, maintenance of link-level consistency has been achieved by way of two different approaches: consistency check and repair, and logging and recovery. In consistency check and repair, a crawling task searches a database and file system to check for inconsistencies and potentially repairs them. Such an approach is time-consuming, not well-targeted, and consumes excessive system resources.

Conventional logging and recovery methods may use logging in the database log or may coordinate with a Transacted File System. In the former method, file system operations are logged in the database log along with database data updates. In such an approach, when the database management system recovers the database, redo and undo operations may be triggered for logged file system operations as well to make file system data consistent with database data in the same database recovery framework. A drawback of such an approach is that the database management system is usually not tightly integrated with the file system, and therefore has no knowledge of the file system's data flushing to the disk. Without the ability to coordinate data flushing, the database management system has to force the log to flush the log record for every file system operation to achieve proper Write-Ahead-Logging, which helps to maintain transactional link-level consistency in a crash recovery. This log forcing results in one disk I/O operation per file system operation, which is typically an unacceptable amount of performance overhead.

The latter method involves coordination with a Transacted File System, where the file system itself is transactional and capable of recovering. The database management system participates in a distributed transaction that is coordinated by a superior Transaction Manager ("TM"). During crash recovery, the superior TM resolves in-doubt transactions and ensures consistency between the database and file system resource managers. A shortcoming of this approach is that Transacted File Systems are not available on commercial operating systems. Therefore, for many database management systems on many OS platforms, this approach is unavailable. In addition, this method has the shortcoming of the added complexity and performance costs in implementation.

Accordingly, there is a need for a mechanism that maintains link-level consistency between database columns and their corresponding FILESTREAM data in the file system while addressing the above shortcomings. The present invention satisfies this need.

SUMMARY OF THE INVENTION

In view of the above shortcomings and drawbacks, methods and computer-readable media are disclosed herein for maintaining transactional link-level consistency between a database and a file system. In one method, a file system change is logged in a record of a database log and a file corresponding to the file system change is created in a file system folder. During a restart recovery process, an analysis operation and a conditional redo operation are performed based on the database log, and a conditional redo operation and an undo operation are performed based on the files in the file system folder. An undo operation is then performed based on the database log.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
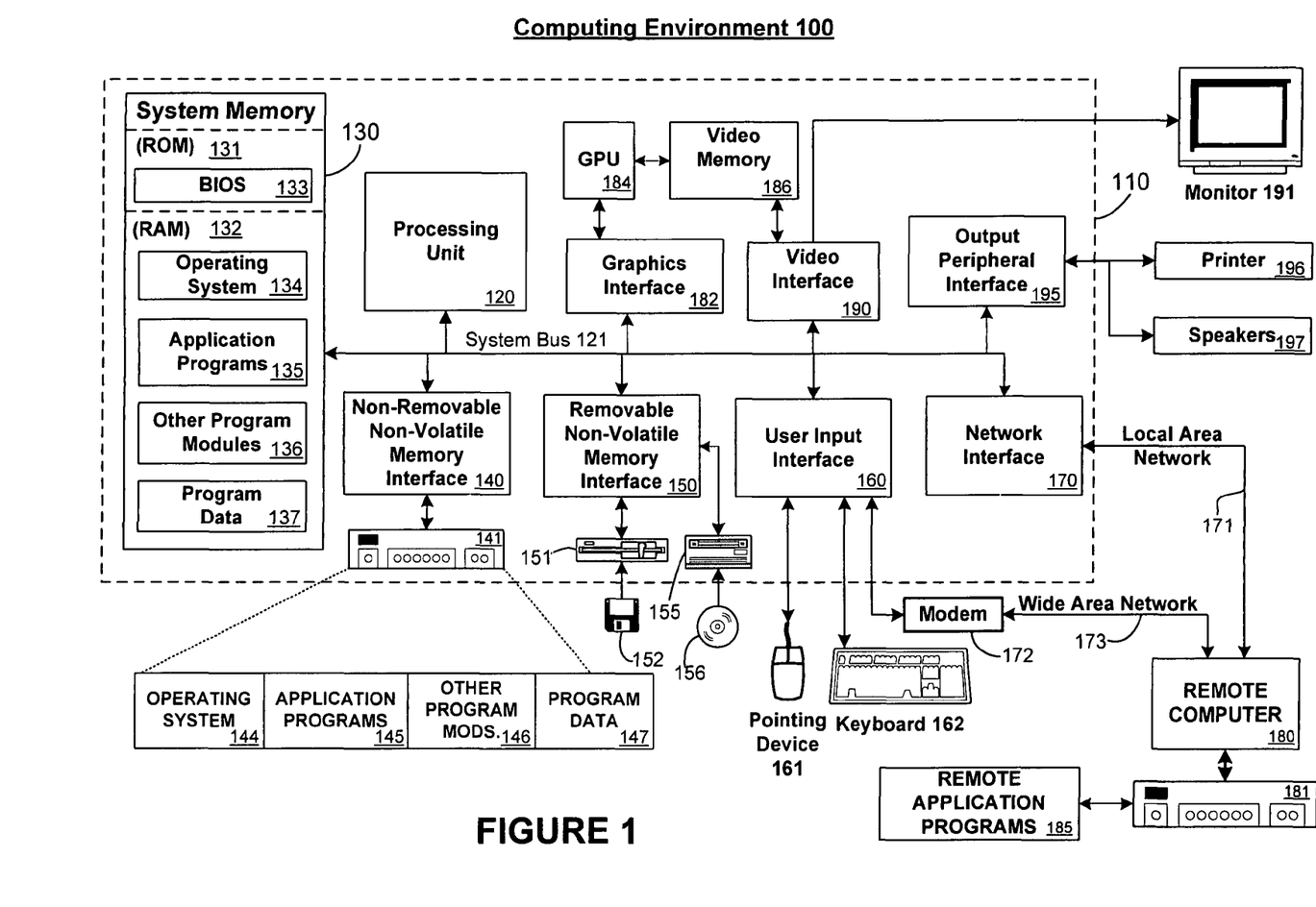
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Database Environment

In the discussion that follows, it is assumed that one skilled in the art is familiar with an implementation of a FILESTREAM data storage attribute in connection with a database. Such matters are discussed in U.S. application Ser. No. 10/353,730, titled "FILESTREAM Data Storage Attribute" filed Jan. 29, 2003, and U.S. application Ser. No. 10/353,545, titled "Logical Pathname as a Reference Mechanism for Data" filed Jan. 29, 2003, both of which are herein incorporated by reference in their entirety. Details of such matters are therefore omitted herein for clarity.

Figure 2:
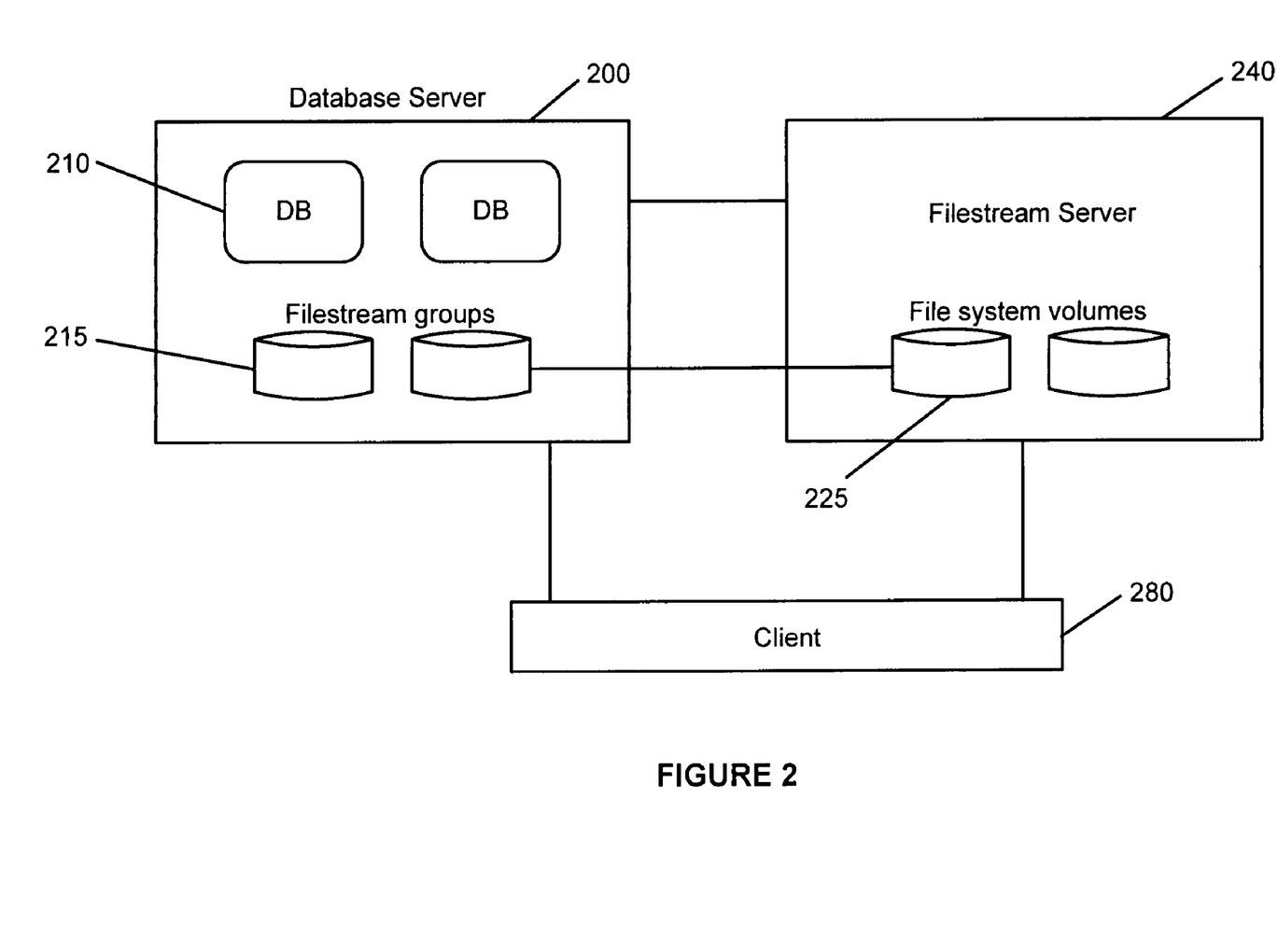
FIG. 2 is an example database configuration in which aspects of the invention may be implemented.

To provide additional background information to put the following discussion of embodiments in context, however, FIG. 2 illustrates an example database configuration in which aspects of the invention may be implemented. Referring now to FIG. 2, three machines may be implemented to play three different roles: (1) client machine 280 from which a query may be initiated against database(s) 210 to locate and manipulate relevant information; (2) database server 200 that hosts database(s) 210; and (3) FILESTREAM server 240 that manages file system volumes 225 on which the FILESTREAM values (or files) associated with a given database 210 may be stored and supports out-of-band updates to database(s) 210. It will be appreciated that the FILESTREAM files may correspond to a BLOB that is being stored in a database column. Each database can have one or more FILESTREAM groups 215, and each FILESTREAM group 215 can include one or more volumes 225. The volumes may reside on FILESTREAM server 240. In an example database installation, thousands of client machines, tens of FILESTREAM servers and one database server may be present. Specialized configurations arise when the volumes on which FILESTREAM data is stored are collocated with the database.

A registration mechanism may be provided by which the identifiers (e.g., GUIDs) associated with all file system volumes 225 containing FILESTREAM values are registered with a locator service that enables client machine 280 to establish network connectivity with FILESTREAM server 240. Moreover, database server(s) 200 register the identifiers (e.g., GUIDs) of the database(s) 210 hosted by them. One possible implementation of such a locator service would be the domain name system (DNS) service that can map the volume GUIDs and database GUIDs to IP addresses.

FILESTREAM server 240 and the client redirector may be built on a protocol for maintaining the coherency of SQL metadata and FILESTREAM value data between SQL database server 200 and FILESTREAM server 240. On the client side, protocol extensions enable client machine 280 to handle redirected requests from database server 200 to FILESTREAM server 240. To facilitate an optimal offloading of activity from database server 200 to the various FILESTREAM servers 240, the protocol extensions may include the ability to exchange notifications about changes in the metadata of the various tables, e.g., addition of a constraint, trigger or column and deletion of a trigger, constraint or column. A FILESTREAM access module or the like that is implemented as part of the SQL stack may contain the call-outs needed to initiate the propagation/invalidation of cached metadata on FILESTREAM servers 240 and to ensure that they are synchronized with the metadata changes on database server 200.

There are some cases in which the three machine configuration illustrated in FIG. 2 can be collapsed into fewer machines. In one scenario, for example, the file system volume containing the FILESTREAM data may be hosted on the same machine as the database (e.g., SQL) server. In another example scenario, the table may be accessed from the machine hosting the SQL server. From the underlying architecture perspective, this may translate into either accessing a resource across the network or a local resource.

Example Embodiments

An embodiment provides a mechanism for maintaining transactional link-level consistency between a database column (e.g., structured data) and its corresponding FILESTREAM data (e.g., unstructured data) in the file system. As used herein, transactional link-level consistency corresponds to a state where a database, such as for example a SQL database or the like, has an accurate status of files and directories in terms of the files' and directories' names, locations, etc. For example, if a database believes that a file or directory exists with a given name, then the file or directory must exist in the file system, with the given name. Likewise, if the database does not believe a file or directory to exist, then the file or directory must not exist in the file system. The types of file and/or directory operations that may be kept transactionally consistent in an embodiment may include, for example, creation, deletion and/or renaming. As noted above, a loss of transactional link-level consistency could create errors, data corruption or even system crashes because of the data inconsistencies that would result from such a state. In the event of a system crash, link-level consistency may be lost. The ability to reestablish link-level consistency after a crash or other system fault is therefore very important if database operations are to be resumed.

To enable maintenance of transactional link-level consistency, an embodiment may log both undo and redo information before the file system operation is performed. In such an embodiment, recovery redo operations may be conditioned upon update Log Sequence Numbers ("LSNs") because logical operations are not idempotent in the file system. Furthermore, an embodiment may operate in such a manner as to cause the log record to be flushed before the file system metadata is saved to disk in order to facilitate a rollback of the file system effects in case the database transaction needs to be rolled back during recovery. Finally, the file system effects should be able to be flushed to disk at certain points to allow the log to be truncated, thereby saving storage space.

Thus, an embodiment provides a mechanism for logging file system operations (e.g., operations performed on files or directories) in both a database log and in a file system directory. A mechanism of an embodiment is able to achieve Write-Ahead-Logging using the above logging technique in an efficient manner (e.g., without requiring a forced flush to a database log) by leveraging an "ordering property" that is present in common file systems, such as for example NTFS. The "ordering property" dictates that if a file system makes a change A to a file or directory and then makes a change B to a file or directory, upon a crash restart the file system will never have change B without change A. In other words, the point at which the system crashes (the "crash point"), regardless of the reason for the crash, may result in no changes, only change A or both change A and B, but not change B without change A, unless the file system itself is corrupted. In addition, an embodiment may use existing components of the database recovery framework without the need for an external coordinator or Transacted File System. As a result, an embodiment may be widely deployed because of its relatively simple and efficient operation.

In the database environment discussed above, a FILESTREAM data file may be organized into a specific directory for a given database. In an embodiment, every FILESTREAM file may have a path name that encodes the row (that may be represented by the file name), the column, the table and the database in which the file can occur. For example, an example path name for a FILESTREAM file relative to the root of a file stream group may be \FILESTREAM-data-container\table\column\rowguid. The directory structure can be changed during the course of the operations that alter the table structure, e.g., deleting or adding a column, table renames and the like. In each situation appropriate locks may be obtained to preclude operations that manipulate the rows within the table during any such table structure operation. In other words, the database management system may serialize concurrent file system operations performed on the file system objects (file and directory) that are along the same ancestry chain in the file system hierarchy.

It will be appreciated that an embodiment leverage knowledge of such directory rules to maintain transactional link-level consistency. In addition, an embodiment further combines the file system log-based Algorithms for Recovery and Isolation Exploiting Semantics ("ARIES") recovery method with a database management system's ARIES recovery method. In such a manner, the recovery of each system is independent of the other, yet when combined by an embodiment the recoveries bring the database data and file system data to transactional link-level consistency. ARIES recovery systems should be known to one of skill in the art and therefore implementation details relating thereto are not included herein for clarity.

Such a combination of the database management system's ARIES recovery with the file system's ARIES recovery may be enabled by an embodiment's use of, for example, a filename for logging purposes in the file system. In such an embodiment, the LSN of a particular operation may be encoded into the name of a file. The same name of a file will also be encoded with the name of the file system object (file or directory) that undergoes the file system change. It will be appreciated that such filename-based logging (i.e., tying the LSN with the file system object name) avoids problems associated with file ID based logging, as file IDs may be reassigned by the file system upon database restoration and therefore are not adequately stable for logging purposes.

Thus, an embodiment may be implemented in connection with a database that uses FILESTREAM data attributes for storing BLOBs. In such a database, a file system operation (e.g., creating, renaming or deleting a BLOB) is logged in both a database log and a file system log. When logging the operation in the file system log, the operation may be recorded as a zero-byte file (such zero-byte files are referred to herein as "file system log entries"). A LSN may be assigned to each database log record. In the case of the file system log entry, the LSN of the corresponding database log record may be used and encoded into the filename. The filename may also contain other encoded information that describes the operation being logged. It will be appreciated that such encoding may simply be placing the LSN and other operation descriptor information into the filename without any additional processing, as will be discussed below, or the LSN and any other information may be stored in any type of format such as, for example, encrypted using an algorithm, or the like.

In operation, an embodiment provides that when a file system operation is to be performed, the operation is first logged in the database log, then the file system log, and then the file system operation is performed. By providing that the log entries are entered prior to the actual file system operation, a recovery method should be able to determine how to undo any operation because the operation's file system log entry will be present whenever the operation itself occurred and may need to be rolled back.

A file system folder may be used to log a file system operation to achieve write-ahead-logging. For example, before a file A is created under folder X, a file called LOG\X~A.LSN.Xact-ID.Create would be created in a file system folder called LOG. This filename has enough information encoded in it to represent an action being performed (LSN, Xact-ID, A and Create being descriptors representing the LSN, transaction ID, filename and creation operation, respectively). In an embodiment, this filename is stored prior to the performance of the create operation. Therefore, the ordering property discussed above indicates that if A exists, then the LOG\X~A.LSN.Xact-ID.Create log entry must also exist. This knowledge may be used by an embodiment in case the operation is to be rolled back. Note that an embodiment may require the file system log folder to be collocated on the same volume as the file system data if, as in NTFS, the "ordering property" discussed above is applicable only within the same volume.

For deletion of either a directory and/or a file, an embodiment provides for the renaming of the item to be deleted so that in case of a rollback the item may be restored. As may be appreciated, if the item to be deleted was actually deleted instead of renamed, a rollback of the deletion operation would not be possible because there would be no data from which to restore the item. An embodiment may use a file system folder named, for example, DELETED for this purpose.

Figure 3A:
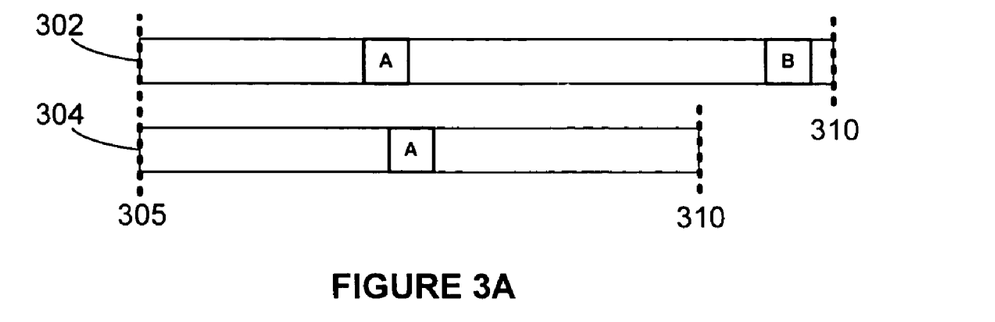
FIGS. 3A-C are example logs in which aspects of the invention may be implemented.
Figure 3B:
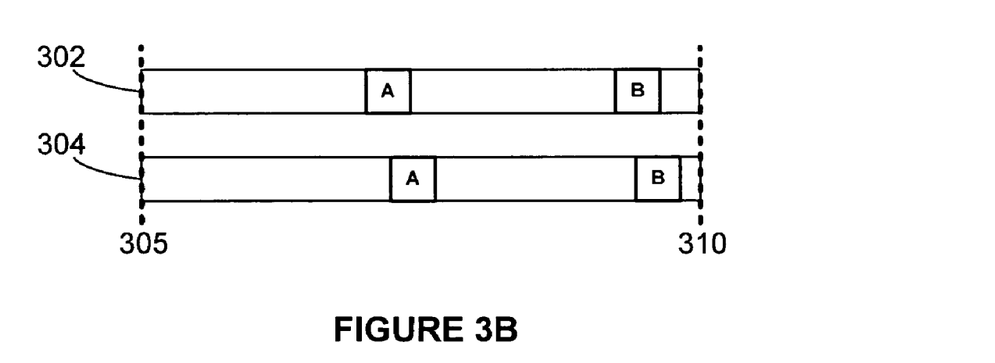
Figure 3C:
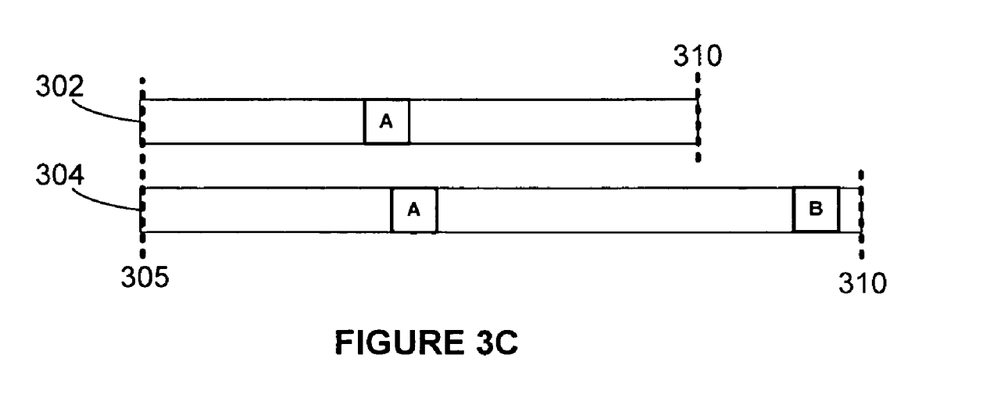

Now that example file logging operations have been discussed, an embodiment relating to crash recovery will be discussed. It will be appreciated that in the event of a system crash, at the crash point one or more of the log entries and/or the file system operation may not have occurred. When the database is to be restarted, the logs may be in a variety of configurations as a result of the crash. FIGS. 3A-C illustrate three example log scenarios that may result from a system fault, such as a crash or the like.

FIG. 3A illustrates database log 302 and file system log 304 having log entries recorded therein. Crash point 310 represents the time at which the system ceased operations, whether due to a system crash, error or the like. It can be seen that logs 302 and 304 are represented in FIG. 3A as time lines, with the left side of logs 302 and 304 being further back in time, and with the right side being more recent in time. Operations A and B represent log entries having appropriate LSNs. Thus, a scenario can be seen in FIG. 3A in which database log 302 has changes A and B recorded, while file system log 304 has only change A. Operation A as recorded in file system log 304 may be a filename as described above. As will be discussed below in connection with FIG. 4, an embodiment may perform ARIES recovery completely based on the database log 302 because database log 302 has captured more information than the file system log 304.

FIG. 3B represents a scenario where both database log 302 and file system log 304 have flushed changes A and B prior to crash point 310. In such a scenario, an embodiment may also perform ARIES recovery completely based on the database log 302 because database log has captured at least the same amount of information the file system log 304 has captured.

FIG. 3C represents a scenario that takes into consideration some practical issues relating to database logs in general. While an embodiment provides, as noted above, that database log 302 may be updated prior to file system log 304, database log records may not be flushed with sufficient frequency to commit the log records to database log 302 prior to file system log entries being committed to file system log 304. It will be appreciated that flushing a log requires expensive system I/O operations. Thus, some situations may arise when a database is configured to flush its log records/entries with less frequency as a trade-off for greater processing speed. FIG. 3C represents, therefore, that a change B was logged in both database log 302 and file system log 304, but was only committed in file system log 304 and therefore change B only remains in file system log 304 after a system crash. Thus, upon a crash restart, change B has only been logged in file system log 304, even though a log record was created for database log 302 first. As will be discussed below in connection with FIG. 4, in such a scenario an embodiment may treat file system log 304 as a logical extension to database log 302, in which additional information about file system operations that were not captured by database log 302 are used to rollback the file system to a state consistent with the crash point of database log 302.

Figure 4:
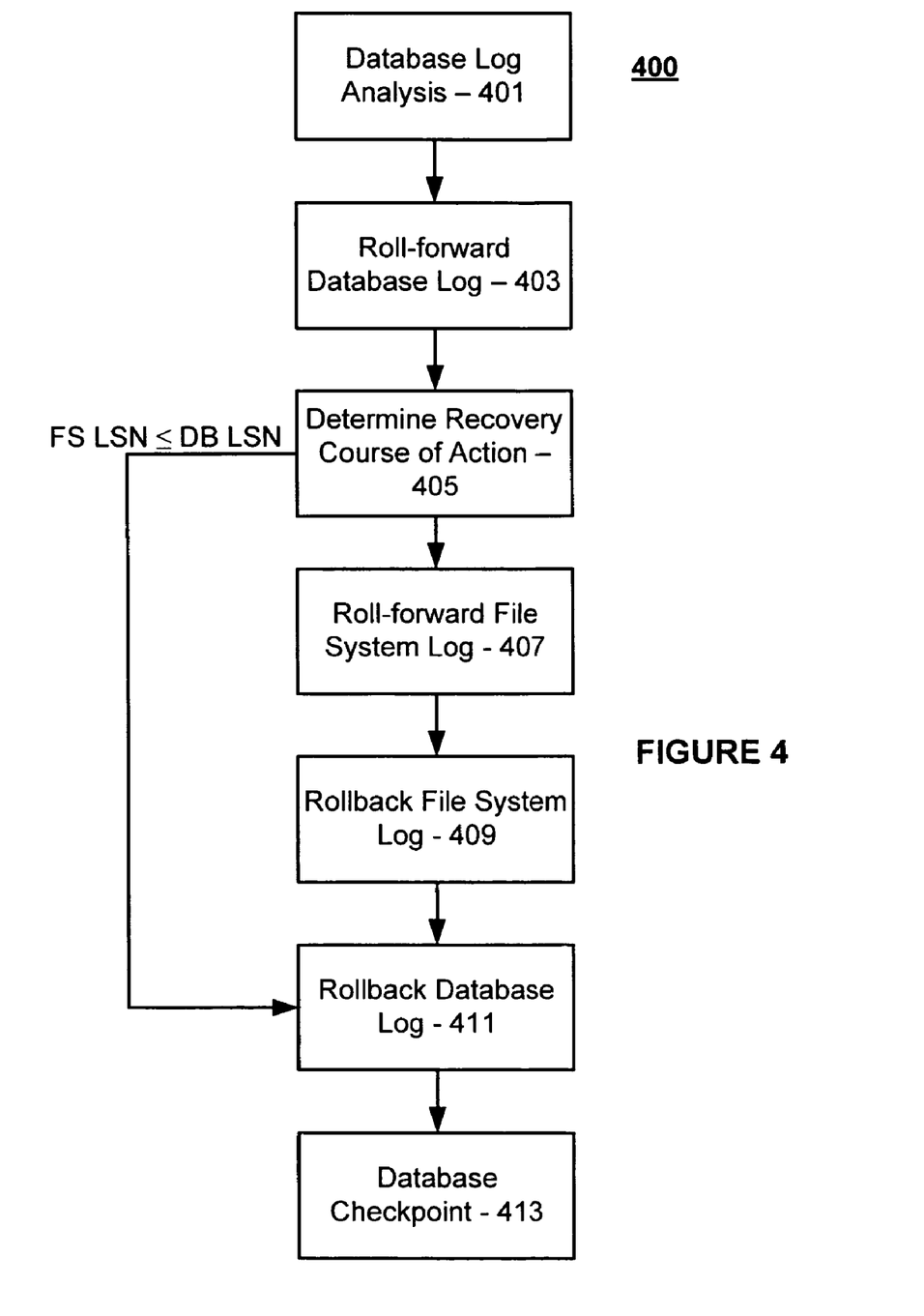
FIGS. 4-5 are flowcharts illustrating example methods according to embodiments of the present invention.

Referring now to FIG. 4, a flowchart is provided that represents an example method 400 of recovering a database after a system crash or the like. It will be appreciated that example method 400 incorporates ARIES algorithms. In addition, one should appreciate that example method 400 may review a database and file system log as discussed above in connection with FIGS. 3A-C.

Thus, at step 401, a database log, such as database log 302 as discussed above in connection with FIGS. 3A-C, is analyzed to find all log records that have accumulated since a check point or the like, including the log record having the most recent LSN. It should be appreciated that step 401 may, in an embodiment, take place as in a typical ARIES analysis phase, where an embodiment collects active transactions so that at the time of rollback the transactions that need to be rolled back are identified.

At step 403, a database log, such as database log 302 as discussed above in connection with FIGS. 3A-C, may be rolled forward by conditionally re-applying the file system changes according to the information stored in the log records. For every log record, the redo operation may be conditioned upon a comparison between two LSNs, namely the LSN of the log record itself (e.g., "LSN1" for illustration purposes), and the greatest LSN that has been logged in the file system log folder for the file or directory name corresponding to the redo information, or for any ancestor directories (e.g., "LSN2" for illustration purposes). If LSN1 is greater than LSN2, then this indicates that the file system log entry for the file system change has not been committed to the disk based on the "ordering property" discussed above. In addition, this indicates that the actual file system change has not been committed to the disk either, because as discussed above the actual file system change is always made after the file system log entry is created. In this case, the redo of the file system change described in the database log record is performed.

If LSN1 is less than LSN2, then the actual file system change has been committed to the disk. This is because, as discussed above, in a database that holds FILESTREAM data, changes made to the same file/directory name and its ancestors are serialized. In other words, the file system log entry with LSN2 will not be created until the file system change corresponding to LSN1 is completed first. The "ordering property" guarantees that if the file system log entry with LSN2 has been committed to the disk, then the file system change corresponding to LSN1 must have been committed to the disk as well. Thus, in this case the redo is skipped.

If LSN1 is equal to LSN2, then the actual file system change may or may not have been committed to the disk. In this case, an embodiment may determine whether the change may need to be reapplied based on the actual state of the file system. For example, if the log record/entry describes "Create File A," then the file system will be checked to see if file "A" already exists. If it does, then there is no need to re-apply the change. If file "A" does not exist, then file "A" will be re-created. It should be appreciated that step 403 may, in an embodiment, take place as in a typical ARIES redo phase.

At step 405, a determination is made as to the type of recovery that is required, depending on the state of the database and file system logs. In addition, steps preparatory to recovery may be taken in connection with step 405. For example, the logs may be in any of the situations discussed above in connection with step 403 and FIGS. 3A-C. In an embodiment, each file in a file system log folder that is past a corresponding database log's end LSN may be scanned and may have its file names recorded in memory. The filenames may then be sorted in, for example, LSN order to permit sequential or reverse, or the like, scan orders according to LSNs for both roll-forward and rollback purposes. The log entries having LSNs that are beyond the database log's end LSN may need to be rolled back because an embodiment may recover the file system to a state reflected by the end of the database log. An embodiment may skip steps 407 and 409 discussed below, if step 405 finds that there is no log entry in the file system log with an LSN that is greater than the database log's end LSN. Such situations are described above in connection with FIGS. 3A-B.

At step 407, a roll-forward process conditionally performs a redo operation based on every file system log entry recorded in memory by step 405 in an ascending order based on LSNs. The actual conditional redo algorithm may, in one embodiment, be identical to that described above in connection with step 403. At step 409, a rollback process may be performed based on the file system log entries recorded in memory by step 405 in a descending order based on LSNs. Performance of an undo operation in a file system's log folder may generate a Compensation Log Record ("CLR"), as should be known to one of skill in the art. Such a CLR may need to be appended in the file system log folder, but not in a database log. Upon completion of the rollback process in the file system log, all file system effects may be flushed so that file system log entries with LSNs greater than the database log's end LSN may be deleted.

One will appreciate that such an operation may be significant because once any subsequent database log rollback starts, the rollback process may begin logging CLRs in both the database log and the file system log. As a result, if the file system log was not cleared out beyond the database log's end LSN, there might be LSN collisions caused by the database log's rollback CLR logging activity. To flush the file system, an embodiment may track all the files that have been affected up to the end of step 409, and then flush each one of those files. An embodiment may also leverage the file system "ordering property" to simply create a new temporary file, flush this temporary file and then subsequently delete it. This new file creation and flush causes all prior file system changes (e.g., create, delete, rename) to be flushed as well, or otherwise the "ordering property" may not hold. At the completion of step 409, therefore, the file system has been rolled back to a state reflected by the end of the database log.

In an embodiment, an undo operation does not take up extra disk space. For example, an undo of a file creation only releases a disk resource. An undo of a file delete may merely rename an existing file without increasing disk space usage. It will be appreciated that such a feature may be important in situations where disk space has been almost completely consumed.

At step 411, a rollback may take place from the end of a database log up to the oldest active LSN. It should be appreciated that step 411 may, in an embodiment, take place as in a typical ARIES undo phase. Once step 411 is completed, the database and file system have been brought back to a mutually consistent state.

At step 413, therefore, a checkpoint operation may be performed prior to accepting any new file system operations. In such a manner, the recovery process that occurred above in connection with steps 401-411 would not have to be repeated for the same operations should a system error, such as a crash or the like, occur in the future.

It will be appreciated that method 400 of FIG. 4 takes place by incorporating ARIES methodology into an embodiment's database and file system recovery method. However, it should also be appreciated that an embodiment may incorporate elements that operate differently than ARIES. For example, and turning now to FIG. 5, an example method 500 of rolling back a file system log having CLRs is illustrated. Method 500 may take place in connection with method 400 as discussed above in connection with FIG. 4. In a typical ARIES recovery, CLRs are not undone. As will be seen in the discussion that follows, an embodiment permits such undo operations to be performed to CLRs.

Figure 5:
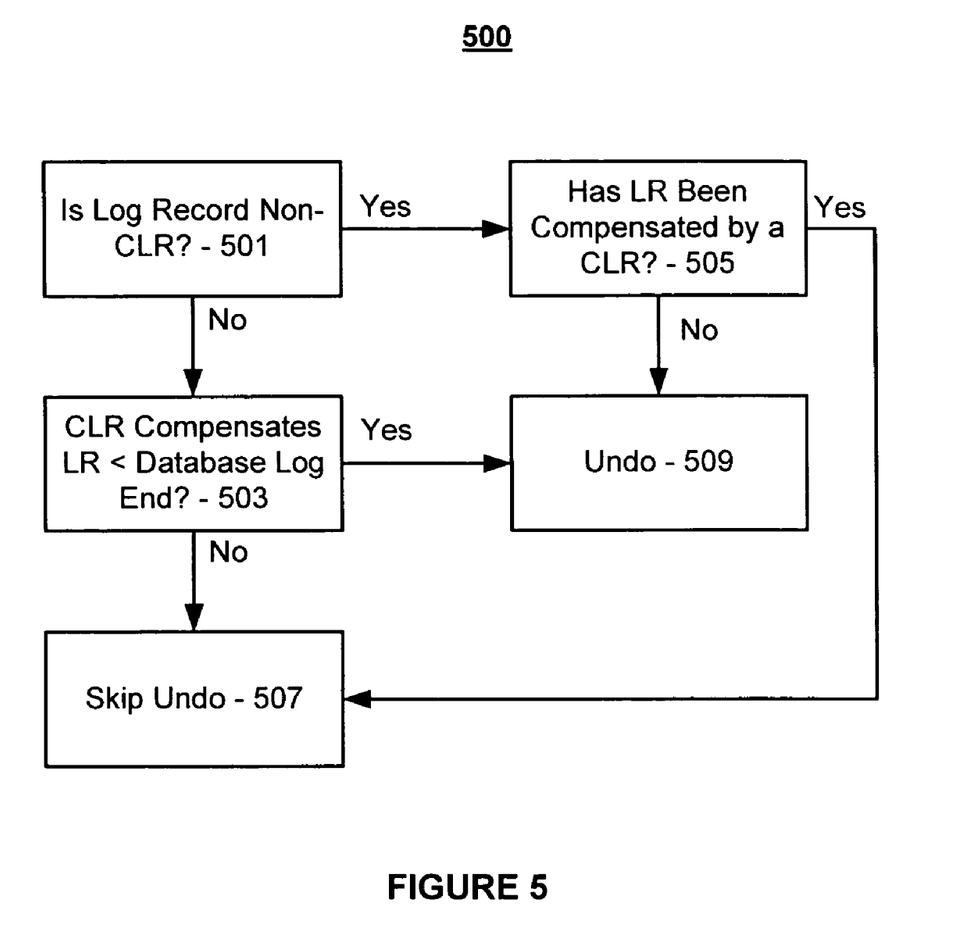

Accordingly, at step 501, a determination is made as to whether a log record is a non-CLR log record. If so, a further determination is made at step 505 as to whether the log record has been compensated by a CLR. If it has not, an undo operation is performed at step 509. If it has, then the undo operation is skipped at step 507. If the outcome of the determination made in step 501 is that the log record is not a non-CLR record (i.e., the log record is a CLR record), at step 503 a determination is made as to whether the log record is a CLR that compensates a log record that is before the end of the database log (as determined by LSNs or the like). If so, at step 509 an undo operation is performed on the record. If not, then the log record is a CLR that compensates a log record that is after the end of the database log. In such a case, at step 507 the undo operation is skipped. As may be appreciated, undoing a CLR may cause yet another CLR to be logged (indicating the undo of the previous CLR). However, an embodiment contemplates that because a recovery operation for a particular file system operation may result in at most two CLRs to be generated in the file system log, a file system log space reservation should, for example, guarantee that enough space is reserved for creating two files that represent the two separate CLRs.

It should be appreciated that the procedure described above for dealing with CLRs avoids storing any persisted state across the file system log rollback and the database log rollback, in order for each rollback process to be independent from the other. Other embodiments may persistently remember such state as to which log records in the database log have been compensated by a CLR in the file system log, while adhering to the ARIES algorithm to skip UNDO operations for CLRs.

It will also be appreciated that an embodiment may choose to implement the logging and recovery discussed above exclusively according to a file system log folder, without duplicated logging in the database log. An embodiment contemplates, however, that the performance of a database logging facility is typically much better than that of a file system folder based log. Therefore, an embodiment performs recovery operations based on a database log and only uses the file system log as an extension for those operations not captured by the database log. As a result, overall recovery performance is improved as compared to using the file system log alone.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method of maintaining transactional link-level consistency between a database and a file system, comprising:
    receiving a file system change request for a binary large object, wherein a reference to the binary large object is stored in a cell of a database and the binary large object is stored outside the database as a file in a file system;
    comparing contents of a database log of the database to contents of a file system log of the file system;
    in accordance with a result of the comparing, logging, by the database, a file system change associated with the file system change request in the database log;
    logging, by the file system, the file system change in a filename of a file system log file, wherein the file system log file is stored as a file in the file system, wherein information that describes the file system change is encoded in the filename for the file system log file; and
    executing, by the file system, the file system change for the binary large object.

2. The method of claim 1, wherein logging the file system change in the file further comprises:
    encoding information identifying that the file system change request is a request to save the binary large object in the filename of the file system log file.

3. The method of claim 1, wherein logging the file system change in the file system log file further comprises:
    encoding information identifying a file system object name, a Log Sequence Number, a transaction identifier, and an operation descriptor corresponding to the file system change in the filename of the file system log file.

4. The method of claim 1, wherein logging the file system change in the file system log file further comprises:
    encoding information identifying a Log Sequence Number of the database log in the filename of the file system log file.

5. The method of claim 1, wherein said logging the file system change in the database log and logging the file system change in the file system log file execute prior to executing the file system change.

6. The method of claim 1, wherein the file system change includes modifying the binary large object.

7. A computer system configured to maintain transactional link-level consistency between a database and a file system, comprising:
    a processor coupled to a computer readable storage medium, the computer readable storage medium comprising:
    instructions for storing a reference to a binary large object in a cell of a database;
    instructions for storing the binary large object outside the database as a file in a file system;
    instructions for determining that a change to the binary large object failed by comparing a log sequence number stored in a database log to a log sequence number stored in a file system log, wherein the log sequence number is encoded in a filename for a file system log file stored in the file system;

wherein the database log is stored in the database, wherein the file system log is stored as a file in the file system, and instructions for redoing the change by logging, by the file system, the change in the file system and executing, by the file system, the change for the binary large object.

8. The computer system of claim 7, wherein the filename for the file system log file further comprises a file system object name, a transaction identifier and an operation descriptor corresponding to the file system change.

9. The computer system of claim 7, wherein each file system log is stored in a separate file.

10. The computer system of claim 7, wherein the instructions for determining that the change to the binary large object failed further comprise:

instructions for comparing a maximum log sequence number in the database log to a maximum log sequence number in the file system log.

11. A computer-readable medium having computer-executable instructions for performing a method of maintaining transactional link-level consistency between a database and a file system, the method comprising:

comparing contents of a database log of the database to contents of a file system log of the file system;

in accordance with a result of the comparing, logging a change to a binary large object in a record of the database log, wherein a reference to the binary large object is stored in a cell of the database and the binary large object is stored outside the database as a file in a file system, wherein the database log is stored in the database;

logging, by the file system, a file system change to the binary large object in a file system log file, wherein the file system log file is stored as a file in the file system; and encoding in a filename of the file system log file information that identifies a file system object name, a Log Sequence Number, a transaction identifier and an operation descriptor corresponding to the file system change.

\* \* \* \* \*